United States Patent [19]

Hondulas

[11] Patent Number: 5,337,516

[45] Date of Patent: Aug. 16, 1994

[54] TREATMENT OF POLLUTED WATER USING WETLAND PLANTS IN A FLOATING HABITAT

[76] Inventor: John L. Hondulas, Rte. 4, Box 505, Gatlinburg, Tenn. 37738

[21] Appl. No.: 697,593

[22] Filed: May 8, 1991

[51] Int. Cl.$^5$ ............................................. A01G 31/02
[52] U.S. Cl. ............................................. 47/65; 210/602
[58] Field of Search ................. 47/65; 210/602, 242.1

[56] References Cited

U.S. PATENT DOCUMENTS

| | | |
|---|---|---|
| 2,222,310 | 11/1940 | Emery . |
| 3,770,623 | 11/1973 | Seidel . |
| 4,169,050 | 9/1979 | Serfling et al. . |
| 4,290,229 | 9/1981 | Miura ........................... 47/65 D |
| 4,333,837 | 6/1982 | Plosz et al. . |
| 4,513,533 | 4/1985 | Gething et al. ............... 47/65 D |
| 4,536,988 | 8/1985 | Hogen ........................... 210/602 |
| 4,839,051 | 6/1989 | Higa . |

FOREIGN PATENT DOCUMENTS

| | | | |
|---|---|---|---|
| 0003800 | 3/1974 | Japan ........................... 210/602 |
| 0132358 | 10/1979 | Japan ........................... 210/602 |
| 893895 | 12/1981 | U.S.S.R. ........................ 210/602 |
| 9002710 | 3/1990 | World Int. Prop. O. ......... 210/602 |

Primary Examiner—Ramon S. Britts
Assistant Examiner—Joanne C. Downs
Attorney, Agent, or Firm—Jacobson, Price, Holman & Stern

[57] ABSTRACT

An apparatus for treating waste water including a waste water basin and a number of wetland plants in floating containers adapted to float on the surface of waste water in the waste water basin such that the root systems of the wetland plants treat the waste water. The floating containers are constructed so that they retain soil and/or another particulate solid required to sustain and nourish the wetland plants and also so that they permit the root systems of the wetland plants to grow outwardly into the waste water to be treated. The root systems produce aerobic zones within the waster water in the waste water basin. The extent of the growth of the root systems is controlled, preferably by an adjustable platform associated with each floating container, so that the aerobic and anaerobic zones within the waste water basin are controlled and can be adjusted or varied as required.

16 Claims, 5 Drawing Sheets

TREATMENT OF POLLUTED WATER USING WETLAND PLANTS IN A FLOATING HABITAT

BACKGROUND OF THE INVENTION

A new technology is evolving using wetland plants to treat contaminated and/or polluted water which will be referred to hereafter as "waste water". The technology, as it has evolved to the present time, is to build a rectangular or square shaped basin, with the preferred design being a rectangular shaped basin whose length is several times its width. The basin bottom and sides are lined with a plastic, water impervious material. The basin is then filled with solid materials such as ordinary soil, clay, rock, gravel, sand, silt, fly ash or a combination of the above, to a depth of twelve inches to two and half feet. The nature of the solid materials may be any of the above or others; the nature of such solid materials is not germane to the present invention. Any wetland plant which can be found growing naturally in wet or damp environment such as ponds, rivers, marshes, and drainage ditches is then introduced and planted within the solid materials-filled basin.

The most popularly used wetland plants to date are: bulrushes, cattails, reeds and sedges. Wetland plants, as defined and referred to in this invention, are any higher order of aquatic plant which have no natural ability to float in water, but must be rooted in soil or a solid substrate. Natural floating plants such as pond weeds, hyacinths, duckweeds and water lettuce which are not required to be rooted in soil or another solid substrate are not within the purview of this invention. This list is not intended by any means to be a complete one.

The usual method is to permit sufficient soil to remain attached to the wetland plant when it is planted within the solids filled basin to function as an initial nutrient and life support system for the plant. Waste water is then admitted into the basin after having first received primary treatment. The primary treatment is performed within a separate basin or tank large enough to allow for detention time of two to three hours, during which time most of the settleable solids will have settled out of the waste water onto the bottom of the primary tank for removal and treatment elsewhere. Such treatment may consist of aerobic or anaerobic digester facilities.

The removal of the settleable solids out of the waste water stream is now absolutely essential under the present technology, as their presence in the waste water stream, if admitted directly into the wetland treatment basin, will cause the solids to be deposited and piled up at the admitting end of the basin, filling up the spaces within the solids media of the basin causing odor, treatment and flow through problems. A flow through simply means that the water stream instead of filtering its way through the media and around the wetland roots where it may be treated, is prevented entry therein by the presence of settled solids, and simply overflows across the top of the basin and exits from the system in an untreated state.

Treatment of polluted water by wetland plants is accomplished because of the ability of wetland plants to bleed or leak oxygen from its root system into the surrounding water thereby supporting bacteria colonies which ingest and feed upon the nutrients and solids in the waste water stream. The level of the waste water presently admitted into the basin does not exceed the height of the solids media. Thus, as the relatively solids-free waste water filters through the solids media, it comes into contact with the root system of the wetland plants.

Wetland plants are morphologically and anatomically adapted to growing in a water saturated substrate by the presence of internal gas spaces called aerenchymas throughout the plant's tissue. The function of the aerenchyma is to supply oxygen to the buried or submerged root and other plant parts. The root and rhizomes, however, leak oxygen into the substrate creating oxidized and anoxic zones around the roots. Rhizomes, as referred to here, are roots and those portions of the root system that can send out new growth from the plant.

The presence of these oxidized and anoxic zones around the root systems creates a good environment for aerobic and facultative microorganisms in the rhizospheres. The aerobic bacteria consume and reduce the suspended solids as well as other substances in waste water that contribute to the reduction of oxygen in water referred to in the industry as Biological Oxygen Demand (BOD). The conversion of ammonia compounds to nitrate compounds is a function of these bacteria. A short distance away from the root or rhizome area lies the anoxic zone, wherein oxygen is in short supply. Still yet a further distance away lies the anaerobic zone. In these areas the facultative and anaerobic bacteria thrive, these bringing about the further reduction of suspended solids as well as the reduction of nitrate compounds to nitrogen gas and more basic substances. In short, each plant is a waste water treatment facility as it replicates in a small fashion precisely the functions of our multimillion dollar treatment plants with large concrete basins, pumps, air blowers, settling basins, chemicals, electric motors, lab facilities, etc.

Each plant is presently planted within the solids media basin with rich soil or humus around its root system to provide it with an initial support. As stated above, sometimes the solids media employed in the basin is soil itself. The presence of the soil is also important in the purification process. It removes suspended solids in the waste water, pathogenic bacteria and viruses, by filtration and sorption. Nutrients are removed from water flowing through soil in several ways ions such as $NH_4^+$, $K^+$, and anions such as $PO_4^{+3}$ may be sorbed onto charged surfaces of humic substances. Organic and clay minerals have a higher exchange capability than coarsely textured mineral substances, such as gravel, and sand. This sorption process is not a permanent removal mechanism, but it buffers and stabilizes the system. However, precipitation and co-precipitation taking place within the soils is a more permanent treatment process. Heavy metals may be precipitated with sulfide and co-precipitation of phosphates with iron, aluminum and calcium can remove significant quantities of phosphorus, toxic substances such as heavy metals and radioactive materials are accumulated in the soil and this factor may determine the life of the soil as a media for the plant. Despite the aforementioned advantages, however, using a media comprised entirely of soil shares the same inherent disadvantage as using any other form of solids in the basin, as the entire basin volume becomes filled with soil, the space available to waste water therefore becomes limited and as the spaces between the soil particles become filled with waste and solids from the polluted stream, the plant is denied access to that stream until its root system expands to open up new avenues for the waste water stream. However, there is an upper limit to the growth of any plant root system, and eventually a clogging takes place within the soil media, necessitating the removal of both the plants and the entire soil media within the basin.

The wetland plants planted in the solids filled media basin are usually planted one to three feet apart. Under the best of conditions of temperature, food and plant propagation, it requires at the present time one acre of ground to treat 60,000 gallons of waste water per day. Where freezing temperatures occur seasonally, the treatment rate is reduced to approximately 40,000 gallons of polluted water per day. Removal rates fluctuate between 80% to 95%. Thus, to treat great quantities of waste water as from municipalities, and large industries, may well require treatment capability of one, two or several million gallons of waste water per day. Land demands and acreage requirements using the wetland treatment method as now developed would be quite large, and treatment effectiveness a limiting factor.

Another factor affecting the ability of the present system to treat waste water is the presence of settleable solids which normally range from 100 to 250 parts per million. Some form of pretreatment is presently utilized to remove these solids prior to the admission of waste water into the wetland treatment basin. Such pretreatment at the present time consists of building a large enough holding tank that will permit the waste water stream to be detained within the holding tank for a period of two to three hours. During that quiescent period, the settleable solids will settle to the bottom where they must then be removed for further treatment elsewhere.

Should no pretreatment be undertaken, then the solids in the waste water stream will fill the spaces between the media solids in the wetland basin, particularly at the front end of the basin, creating odor problems, restricting passage of the waste water to and around the root system of the plants, thereby limiting the effectiveness of the treatment process and causing a flow through of the waste water stream as henceforth described.

As the solids media within the basin occupies 80% to 90% of the total basin volume, in addition to limiting the quantity of waste water within the basin, also restricts the growth of the root system of the wetland plant. It is, after all, the root and rhizome area of the wetland plant that supplies oxygen to the bacteria, protozoa, and metazoa colonies that are responsible for the treatment process itself, and reduction of polluted matter within the waste water stream to gases and mineral matter. Further, the solids media presently employed is insignificant in the treatment process with the exception in those instances where soil itself is used a media throughout the basin. However, using soil as a media within the basin presents problems in itself. When soil is used to occupy the entire basin, it tends to compact and, although with the passage of time, the root system of the plants will create underground passages to permit the waste stream to interact with the rhizome area, there is still a tendency to encounter flow through problems.

Yet despite the limitations under which wetland plants presently have to function, they demonstrate a remarkable ability to treat industrial and/or municipal polluted water even in the cold climates of Canada and Northern Europe. These successes have developed despite the fact that the basins in which these wetland plants have been grown limit and restrict the plants' ability to reach and more effectively treat waste water. The effectiveness of the present technology nevertheless is brought out in the following instances.

A report by the Ontario Ministry of Environment presented in the 1981 Conference of Water Pollution Control Federation at Detroit, Mich. describes a one quarter acre open marsh in Listowel, Ontario, Canada planted in Cattail, Typha spp. The basin contained a solids media through out composed of subsoil, topsoil and 10% peat. Waste water was then allowed to flow into the marsh at a depth of 14 centimeters.

The rate of flow from Jul. 1 to Dec. 6, 1980 was at the rate of 4000 gallons per day. The results were, despite the physical limitations alluded to, impressive. In terms of mass loading and percent reduction, BOD was reduced 83% suspended solids were reduced 71% total phosphorus 89% $NH_3$ reduced 99%, and total nitrogen is reduced 78%. This was achieved without artificial or mechanical introduction of air into the basin, in an open marsh and exposed to the rigors of a Canadian fall season. During the winter months, influent temperature of the water dropped to 35 degrees Fahrenheit, the severity of the cold caused almost total anoxia within the basin, pointing out the need of cover or hothousing of the basin area in the cold climates to keep the waste water temperature at a higher level.

Wetland treatment of waste water has been successfully employed in the U.S. at Iselin, Pa. A wetland basin using solids media of 4" stone and 16" sand with a growth of Cattails, has been successfully employed to treat waste water, at an application rate of 50,000 gallons per acre per day. An analysis and report of this facility by the Term Valley Authority, July, 1986, stated that economically marsh land treatment facility could be constructed at $2.00 per gallon per day of treatment capacity as compared to $3.00 to $15.00 per gallon per day for standard treatment facility. On page 10 of the report, the Tenn Valley Authority scientist reflecting on the removal efficiencies of fecal coliform attributed it to the effect of the root excretions of the plants. The report further added "These results are of special significance since they indicate artificial wetland system can be designed to either eliminate the need for chlorination or minimize the chlorine dosage needed to meet the permit limits." Despite the fact that the marsh facility was operated at or over its designed hydraulic load, it was able to reduce the fecal coliform count of 1,000,000 colonies per 100 ml to 720 or almost 100% per cent reduction.

A comparison on the effectiveness of the various types of wetland plants which the author refers to as the higher forms of aquatic plants was given in a report by Gersberg, Elkins, Lyon, Goldman, San Diego Region Reclamation Agency and division of Environment studies, University of California 1985. This was a qualitative assessment on primary waste water treatment at the Santee Water Reclamation facility, Santee, Calif. Four basins were constructed, each 18.5 meters long, 3.5 meters wide and 0.76 meters deep. The basins were plastic lined and filled with gravel. Three of the beds were either planted in bulrushes, reeds or cattails and the fourth served as an unvegetated control bed. Mean concentrations of the primary waste water was 27.8 mg/l total (N), 24.7 mg/l ammonia (N), BOD was 118.3 mg/l and suspended solids, 57.3 mg/l total (N), 24.7 mg/l. Inflow to each bed was 1210 gallons per day or a hydraulic load at the rate of 77,129 gallons per acre per day. Residence time was 6 days. The test period extended from August 1983 to December 1984.

The basin containing bulrushes proved the most effective of all the wetland plants employed in reducing pollutants. Ammonia (N) was reduced from 24.7 mg/l±5.8 mg/l to 1.5 mg/l±1.7 mg/l. The author said, on page 365 volume 20, No. 3 Wat Res, Great Britain, "that when sufficient dissolved carbon is present, the artificial wetlands are very efficient at promoting denitrification, with removal efficiencies of greater than 95% of the nitrate present in secondary waste water at application rates of 40 cm a day." This would be almost 10 times the rate applied in the instant case. The higher nitrogen removal was attributable by the researchers to the ability of the bulrushes, cattails and reeds to transport oxygen down to the roots, and 28% by cattails and only 11% by the unvegetated bed. It was felt that the extended root system of the bulrushes and reeds, greater than 60 cm. as compared to 30 cm. for the cattails, was responsible for the superior removal rates of ammonia and BOD among the former. Mean BOD removal efficiencies (relative to inflow) were 96%, 81.5%, 74% and 69% for the bulrushes, reeds, cattails and unvegetated beds, respectively. The author said, "Since the B.O.D. removal (organic compound degradation) is enhanced under aerobic degradation, it is reasonable to assume that the superior treatment afforded by the Bulrush was due to plant translocation of oxygen to an otherwise anaerobic area." It was stated further on page 367, "Other investigators, however have found artificial wetlands are well suited for waste water treatment even in moderately cold climates, such as Ontario, Canada where they can be operated year round" (Wile 1982 Reed at 1984).

In concluding, the authors reflected on the satisfactory substitution of wetland basins for standard municipal plants, stating on page 365, "The Bulrush bed at the hydraulic application rate of 4.7 meters cubed per day (77,129 gallons per day) produced an effluent with B.O.D. and Total Suspended Solids values less that 10/10 mg/l, standard for advanced secondary treatment and a total nitrogen level less than 2 mg/l. At this waste water application rate approximately 20 acres of constructed wetlands would be required to treat one million gallons per day."

The present invention is designed to eliminate practically all media from the wetland basin, thus permitting unrestricted growth of the plant root and rhizome system, greatly reducing the land area needed to treat comparable flow of waste water to approximately one fourth to one fifth the size presently required in existing systems. Thus, less land will treat more waste water, making this an attractive and cost effective means of treating municipal and industrial waste water in quantities of one million gallons per day and more. It eliminates the necessity of pretreatment as the entire floor of the basin can now be utilized as a receiver for the settleable solids, as the solids media that once occupied the entire basin, is now absent. The absence of solid media means that raw waste water can be directly admitted into the basin without the necessity of building a primary tank. The size or floor area of the wetland basin is on the order of 100 times greater than that of a primary tank. Hence, it is possible that this greatly enlarged floor area of the basin can be utilized to reduce or degrade settled solids through anaerobic and facultative bacterial action whereas by contrast, the floor area of the primary tank being smaller and not designed for treatment but only for collection purposes, is an expensive necessity when a basin for wetland basin is filled with solid media, but is not a necessity when a basin for wetland plants can be designed and operated without such a solid media. The manner in which treatment of settled solids in the wetland basin will be undertaken, shall be explored further in more detail in the Description of the Invention. As a great deal of the settled solids are treated and reduced on the wetland basin floor, further treatment and reduction facilities, such as anaerobic or aerobic digesters can be downsized to less than half in size and cost as those that would otherwise be required using the present technology.

BRIEF DESCRIPTION OF THE DRAWINGS

In the accompanying drawings the apparatus and process of the invention are illustrated.

SUMMARY OF THE INVENTION

The present invention, apparatus, and process are intended to take wetland plants that have no natural capacity to float in water but are rooted to the bottom of wetlands, swamps, etc. and to create for them a floating habitat. This is accomplished by constructing a basket or container which, in addition to a wetland plant, will contain rich earth, humus, clay, and among other options, activated carbon, charcoal, sand, burned and unburnt wood, which materials act as filters and assist the weighted matter to float better in the waste water to be treated and also basically to serve as a life support system to the wetland plant. In addition the basket or container will be attached to floats 4 that will better enable the wetland plant to float in the waste water basin.

Each wetland plant habitat or container can preferentially be attached to others in a row by means of cables 9 or ropes which are in turn anchored to posts along the perimeter of the basin. This will allow the operator of the basin to winch the cable or rope over to the side of the basin to remove or add additional plants and life support systems and then reintroduce them back into the basin.

The basket material may preferentially be any material supported by some rigid frame. The exact nature of this material is not significant to this invention, only that it be of webbed construction so that the plant roots and rhizomes may grow through the basket into the waste water filled basin with loss of the life support material consisting of earth, clay, humus and other materials as described above. The basket material should be sufficiently open weave and porous to permit free flow of waste water into the plant habitat.

The plant container can preferentially also contain an adjustable floor 6 so that it defines the limits of the root system that can grow downward toward the floor of the basin. As the root and rhizome area of the plants generate an aerobic environment, the operator of the basin can, by varying the vertical placement of the adjustable floor, increase or decrease the aerobic and anaerobic zones within the basin. When the basin depth is increased, perhaps four or five feet or even more, the amount of waste water in the basin for treatment is thereby also increased. The operator of the basin has the option to lower the adjustable floor thereby permitting and allowing the plant roots and rhizomes to grow vertically expanding the volume within the basin that will treat the polluted water within it, aerobically.

There are certain fundamental differences in the way the aerobic and anaerobic bacteria function and treat waste water. Both can do the job. Aerobic bacteria do a better job of reducing phosphorus and BOD from waste water, but anaerobic bacteria are better able to reduce suspended and settled solids to mineral and gaseous states. However, the drawback to anaerobic bacteria is their production of bothersome odors. Should the anaerobic bacteria generate gases and odors that are aesthetically objectionable, the operator can reduce the depth of the anaerobic zone by reducing the overall depth of the basin and thereby bringing the wetland plant suspended within its habitat closer to the bottom of the basin. This will bring the plant roots and rhizomes closer to the bottom of the basin converting what had been an anaerobic zone to an aerobic zone. Or the operator may permit the depth of the basin to remain the same but lower the adjustable floor thus allowing the wetlands plants root system to descend lower to provide oxygen and thereby also create an aerobic zone.

Another aspect of this invention is the placement of the effluent pipe and valve 10. It is preferred that it be located at an elevation above the bottom of the basin such that it defines the permanent and minimum depth that the operator of the basin desires. When the waste water stream into the basin diminishes in volume, then the depth within the basin will continue to fall until the level of the water is at the same elevation as the invert of the effluent pipe. At this point any floating oils or other matter will also evacuate from the basin. To prevent this, baffle 13 is constructed transverse to the basin and some few feet, preferably two or three feet from the end, so that floating matter does not leave the basin.

It is important that the valve not be located near the bottom of the basin as that would allow settled matter at the bottom to be evacuated therefrom. Also, should the flow into the basin be interrupted, the basin would continue to empty causing the loss of the basin and its contents. The valve should be throttled so that the ratio of the incoming waste water stream to the volume maintained within the basin will provide for a predetermined detention time. A one to two days detention within the basin is recommended. A larger period would be beneficial but land costs constraints are a limiting factor. It is a fact that both domestic and commercial sewage flow varies dramatically from hour to hour in the day. Thus, surges of waste water into the basin will cause the level of the basin to rise. This will cause the wetland plants in their floating habitats to rise upwards. In the absence of the rhizomes of the plants, the area formerly occupied by the wetland plant root system becomes anaerobic.

When the incoming waste water stream decreases, the basin depth will decrease causing the plant roots system and its aerobic environment to reenter the anaerobic area. This cyclical treatment means that during the anaerobic period there is an explosive growth of anaerobic bacteria which use phosphorus to metabolize and reduce impurities in the waste water. Nitrates, for example, are reduced to nitrogen gas. When the basin becomes shallower and the plant roots and attendant aerobic system is re-introduced there is a concomitant explosive growth of aerobic bacteria which remove the phosphorus from the solution and metabolize ammonia compounds to nitrate compounds. The phosphorus along with some other compounds and minerals drop out of solution and settle to the bottom. Anaerobic bacteria more effectively remove suspended solids and colloidal matter from the waste water but have the disturbing effect of increasing the odor problem. By taking advantage of the periodicity of waste water flow so as to cause the wetland plant root system to rise and fall with the flow, aerobic and anaerobic areas are caused to alternate. This results in better odor control and, more importantly, more efficiently removes pollutants from the basin than would otherwise be the case. The same cyclical treatment is employed in activated sludge sewage treatment plants. It has been determined that by alternately switching the air to the aeration basin on and off, the bacteria experience dramatic growth after periods of decline with improved solids removal rates.

There will continue to be an anaerobic zone along the bottom of the basin, the depth of which will remain the operator's choice. He can reduce this zone by throttling open the effluent valve and reducing the depth of the basin or by lowering the adjustable floor. The former will quickly bring the plants root system to the bottom of the basin while the latter will accomplish the same over a longer period of time. An option also available is to circle each of the wetland plant habitats with thin, waterproof strips 16 that may provide additional support for the expanding root system of the plant. The present invention and process preferably utilizes a rectangular basin with its length approximately ten ties or more than its width. This configuration is standard within the industry. This is by no means exclusive and the invention can use and employ any geometric configuration for the basin design. The basis depth can be made variable by means of a valve at the effluent end of the basin. It is possible employing the present invention to sue basin depths ranging from one and a half feet to five feet. At the onset of operations the preferred depth would be in the two foot range. Greater depths would become the operator's choice and would be a function of plant maturity, plant concentration, BOD and solids values as well as plant flows.

The object and purpose of this invention, therefore, is to create an environment whereby through the elimination of the solids media in the basin, the resulting space within said basin is replaced by waste water, the subject and purpose for its being. That as we have thereby eliminated the only means by which the wetland plant can thrive and find an attachment and therefore to grow, we have substituted a floating habitat, as above described. This habitat will do more than provide a physical support and life support system, but will contain within it elements and properties that will enable the system to filter and cleanse the polluted stream.

The adjustable floor under the habitat in addition to controlling the depth to which the plants root system be allowed to grow, is also in itself a platform for inclusion of other types of marine growth, such as but not limited to fresh water anemones, mollusks which are themselves capable of cleansing functions.

Thus, to eliminate solid type media throughout the basin as is now the present technology, the method of this invention provides a floating support for the wetland plant. This changed environment and circumstance will have several direct beneficial results.

1) It will allow for more intensive cultivation of plants within the basin and a greatly expanded root and rhizome area for treatment of the waste water stream.

2) It will permit greater volumes of waste water to be admitted within the basin if the solids media presently in use are absent.

3) The root depth of the wetland plant is controlled by use of an adjustable floor assembly, thus enabling the operator of the basin to expand or contract the aerobic zones within the basin and conversely the anaerobic zones.

4) The wetland plant always remains near the surface of the waste water stream no matter what the overall depth of the waste water within the basin might be, thus preventing flow through problems.

5) Better and more economic control of the soils media around each plant as the amount of such soil mix is preferably one to two cubic feet, but an operator's choice. This small amount of soil mix surrounded by a body of waste water prevents compaction, a problem when the entire basin is filled with soil. If it becomes necessary to remove the soil around the plant, it can be done on an individual basis, rather that having to go in and remove the entire soils media in the entire basin.

6) The soil mix around each wetland plant can be tailored, to be a life support for the plant, and materials can be added to increase its flotation capability, including materials such as clay, humus, charcoal, activated carbon, and rare earths materials to increase its filtering abilities.

7) It eliminates the necessity of pretreatment of the waste water stream as the solids ladened waste water is directly introduced into the basin where the settled solids and sludge at the bottom of the basin can be anaerobically treated and reduced, reducing the size and costs of further treatment facilities.

8) The adjustable floor arrangement of each plant habitat can be used not only as a control mechanism for the vertical growth of the wetland plant root and rhizome and, therefore, the vertical depth of the aerobic treatment of waste water but can also be used as platforms for the introduction of marine creatures such as fresh water anemones, mollusks and many others, as these have the capacity to cleanse polluted water and remove nutrients therefrom.

9) It provides a floating platform for the wetland plant. The plant always rides the crest of the flow and the fluctuating levels of the waste water, resulting in aerobic and anaerobic zones alternating within the basin. As these zones alternate, they lead to explosive growth of bacteria that can favorably exist in each respective zone.

It is not necessary for the purposes of this invention to describe all of such features. The reasons and purposes expressed above and as many as may be elucidated further, do define the object and purposes of this invention.

The invention and process will be accomplished by constructing a basket or container 1 which preferentially may contain rich earth, humus, clay 2 which will serve as a life support habitat for the wetland plant. Mixed with the above may preferentially be other material such as wood (burnt and/or unburnt), charcoal, activated carbon, and rare earths, with said substances having the capacity to act as filters of the polluted waters and to aid the weighted material to better float in the basin. In addition, the basket or container may preferentially be attached to floats 4 to assist the wetland plant in its habitat to float in the polluted waste stream. Each plant in its basket or container along with admixture of clay, humus, soil, activated carbon, and/or rare earths, will be referred to as a plant habitat. Each plant habitat may preferentially be attached to cables or ropes 9 anchored to posts 7 along the perimeter of the basin. This will allow the operator of the basin to winch the cable or rope over to the side of he basin to remove or add wetland plants and/or their habitat, and to reintroduce them back into the basin.

The exact nature of the basket material is not significant to the invention only that it be of material that will not decay and that it be webbed or so constructed that the root system of the plant may be allowed to grow through the walls of the basket out into the basin and thereby develop as large a rhizosphere as possible. A plastic screen of reasonably heavy gauge with 0.1" to 0.2" openings would typically function very well. This also permits the free flow of waste water into the media around the wetland plant. The basket should also contain a rigid frame for proper support and preferably also contain an adjustable floor 6 so that it may define the limits at which the root system can grow downward toward the floor of the basin.

It is recommended and suggested that straw in light quantities line the inner surfaces of the basket so as to retain as much as possible the solids media that will surround the wetland plants root system. This will reduce loss of soil, life support and filtering media from within the basket as well permit the free flow of the polluted stream through the basket assembly. It will also permit the root system to grow through the straw liner and the webbed surface of the basket liner. The root system of the wetland plant will thus grow through the walls of the habitat into the waste water stream in much the same way that it presently grows in sand or gravel substrate for a distance of 2 feet or more. For reasons already explained, this arrangement permits the operator of the basin to increase or decrease basin depth at will. When the basin depth is increased so that greater quantities of waste water are to be treated, the adjustable floor of each container can be lowered so that the root system of the plant will develop vertically. The operator can allow as much room at the bottom of the basin between the ends of the plant root system and the basin floor as he wishes and thereby create as large an anaerobic area as he may wish.

Should the anaerobic bacteria generate gases and odors that are aesthetically objectionable and it becomes necessary to reduce the anaerobic zone, the operator has the choice of (1) opening the effluent valve and by reducing the volume of waste water within the basin, bring the wetland plant and its habitat closer to the bottom of the basin or (2) vertically lower the adjustable floor under the plant and its habitat, thereby enabling the plants root system to descend vertically, and convert that portion of the anaerobic zone to aerobic zone. Hence, by raising or lowering the adjustable floor under each of the plant habitats, it is possible to increase or decrease the aerobic areas of activity and conversely decrease or increase the anaerobic zone of activities.

DETAILED DESCRIPTION OF THE PREFERRED EMBODIMENTS

Referring now to the drawings, there is shown a preferred embodiment of the present invention. The basket assembly 1 contains a wetland plant 5 and is filled with life supporting and filtering materials 2, such as soil, rich earth, humus, clay, charcoal, activated carbon, wood (burned and unburned), and rare earths. For the purposes of this invention, it is only necessary that the wetland plant 5 in its basket 1 have soil adequate to sustain its life and to provide an area where roots and rhizomes of the plant 5 may treat polluted water. The other substances indicated are to provide filtering capabilities. The addition of wood is intended to increase its floating capabilities and to provide spaces around which roots may grow and bacteria may flourish. As indicated earlier, the basket may preferentially be constructed of any material that will not rot in water and is so woven or constructed that small openings in its fabric will permit the roots 3 of the wetland plant 5 to grow through them into the waste water filled basin and permit the free flow of waste water into the habitat. The fabric is to be supported by some rigid material so that the basket assembly 1 will retain its shape and configuration, and provide a means of attachment to cable or rope 9.

Cable or rope 9 is intended to provide control and uniformity within the basin by enabling the basin operator to place the wetland plants 5 in rows, control their density and to remove and add plants at will. This is simply a preferred means of handling the wetland plants 5 within their basket assemblies 1 but is not indispensable to the invention as the wetland plants 5 may be allowed to float individually and randomly or be rigidly attached by other means.

The adjustable floor assembly 6 consists of one or more platforms suspended under basket assembly 1 so that by means of slip couplings and set screws 16 the adjustable floor 6 can be moved vertically up or down with respect to the basket assembly 1. The slip coupling and set screws 16 are part of the brace or frame work that connects the platforms to the basket assembly 1.

Figure 3:
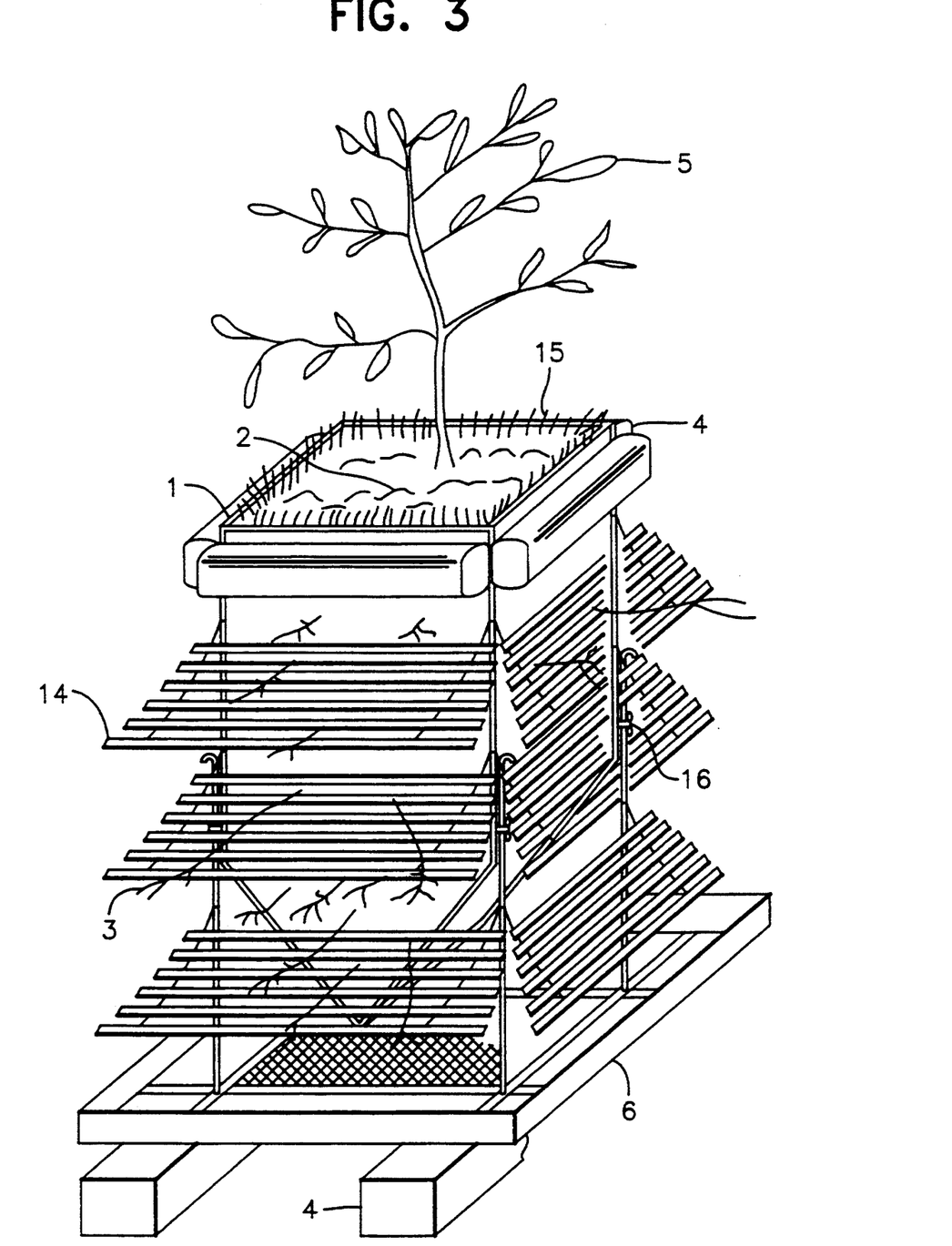
FIG. 3 is an oblique view of the wetland plant, its life support system and basket assembly that comprises the habitat, adjustable floor and slats that act as root support.
Figure 4:
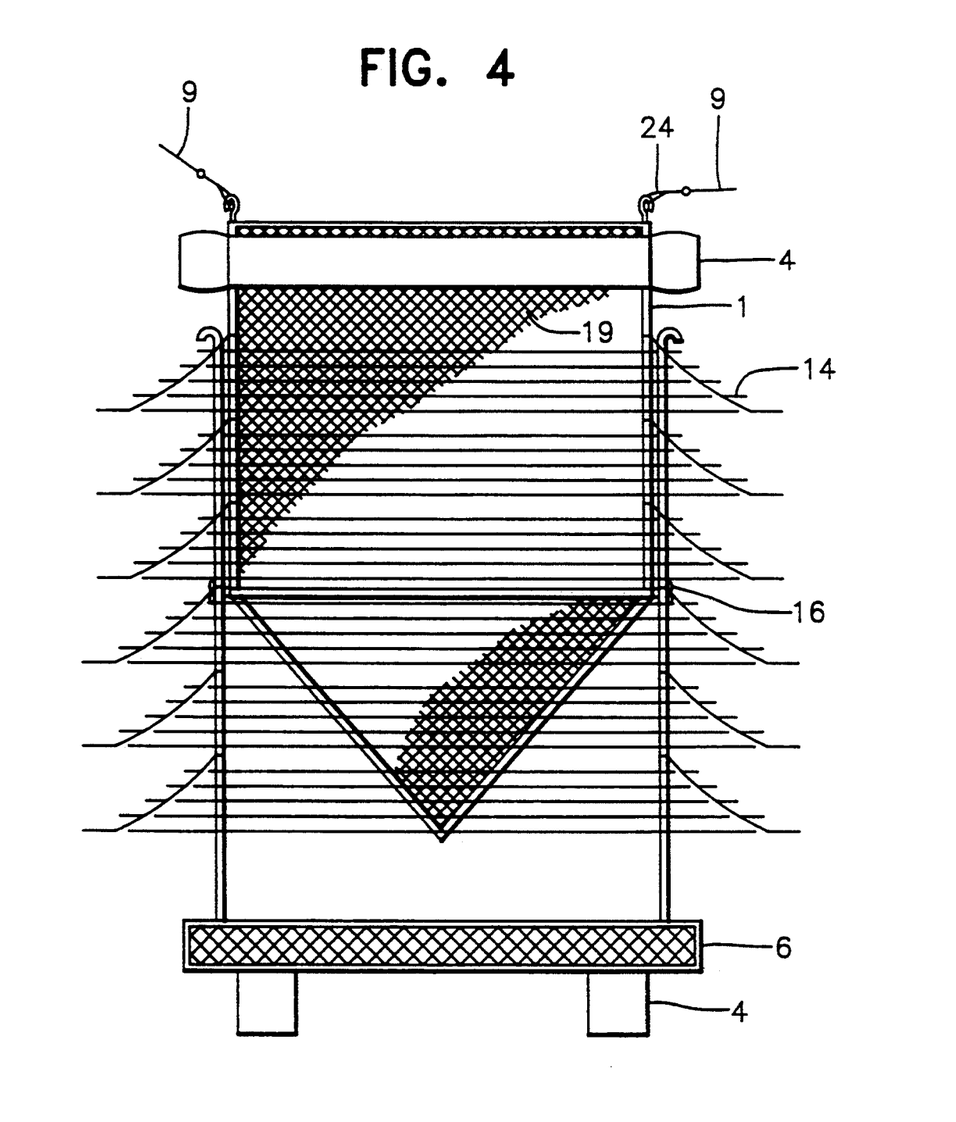
FIG. 4 is a front view of the plant habitat assembly that supports the wetland plant.
Figure 5:
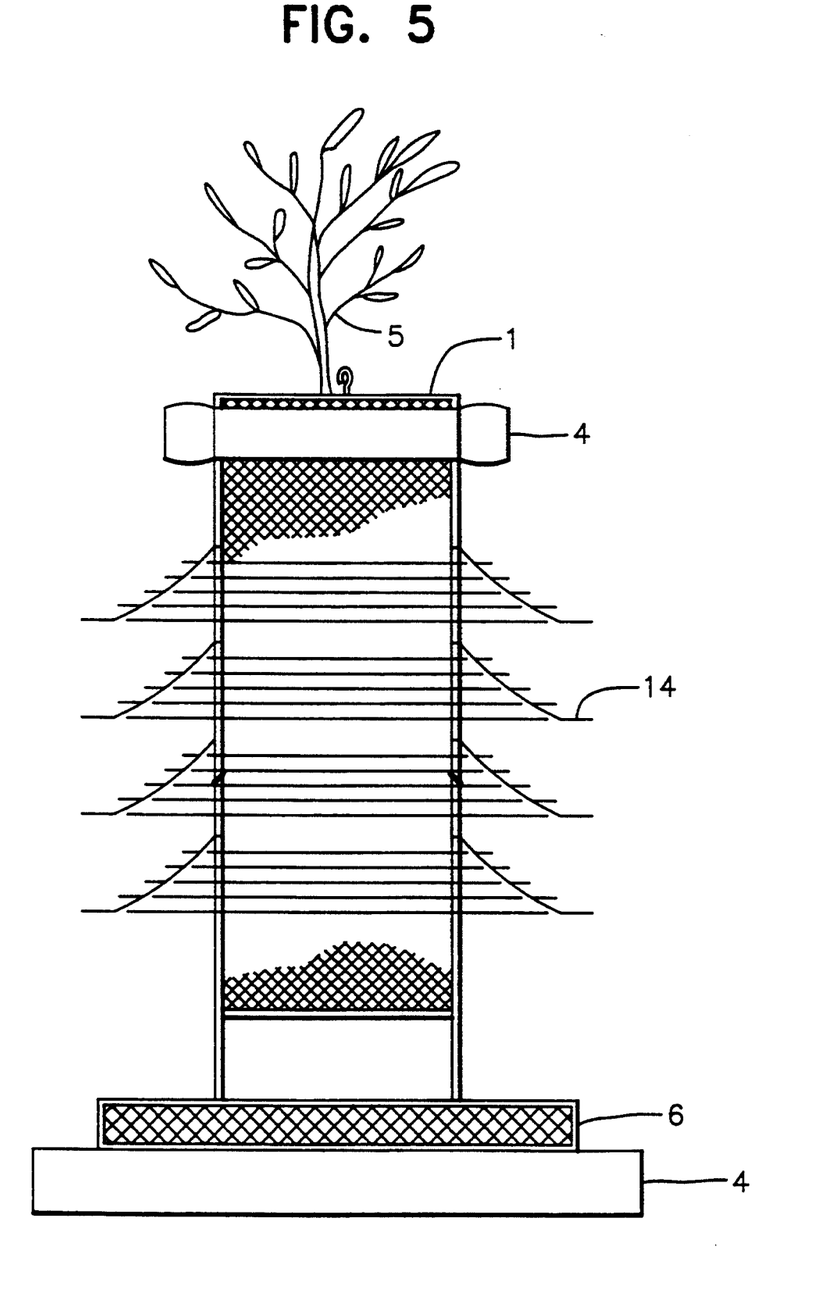
FIG. 5 is a side view of said wetland plant habitat assembly.

Thin strips 14, which are attached to the basket assembly 1 are an additional option for the basin operator as they are intended to provide lateral support for the wetland plant roots 3. Though not indispensable to the invention, thin strips 14 are a preferred addition and are helpful to encourage plant root proliferation. The strips 14 are constructed of rigid material, not decomposable in the waste water stream, and are thin with a width and length that may vary. The strips 14 may have either a flat or curved surface that circumferentially surround each wetland plant and basket assembly 1 as shown in FIG. 3.

Figure 1:
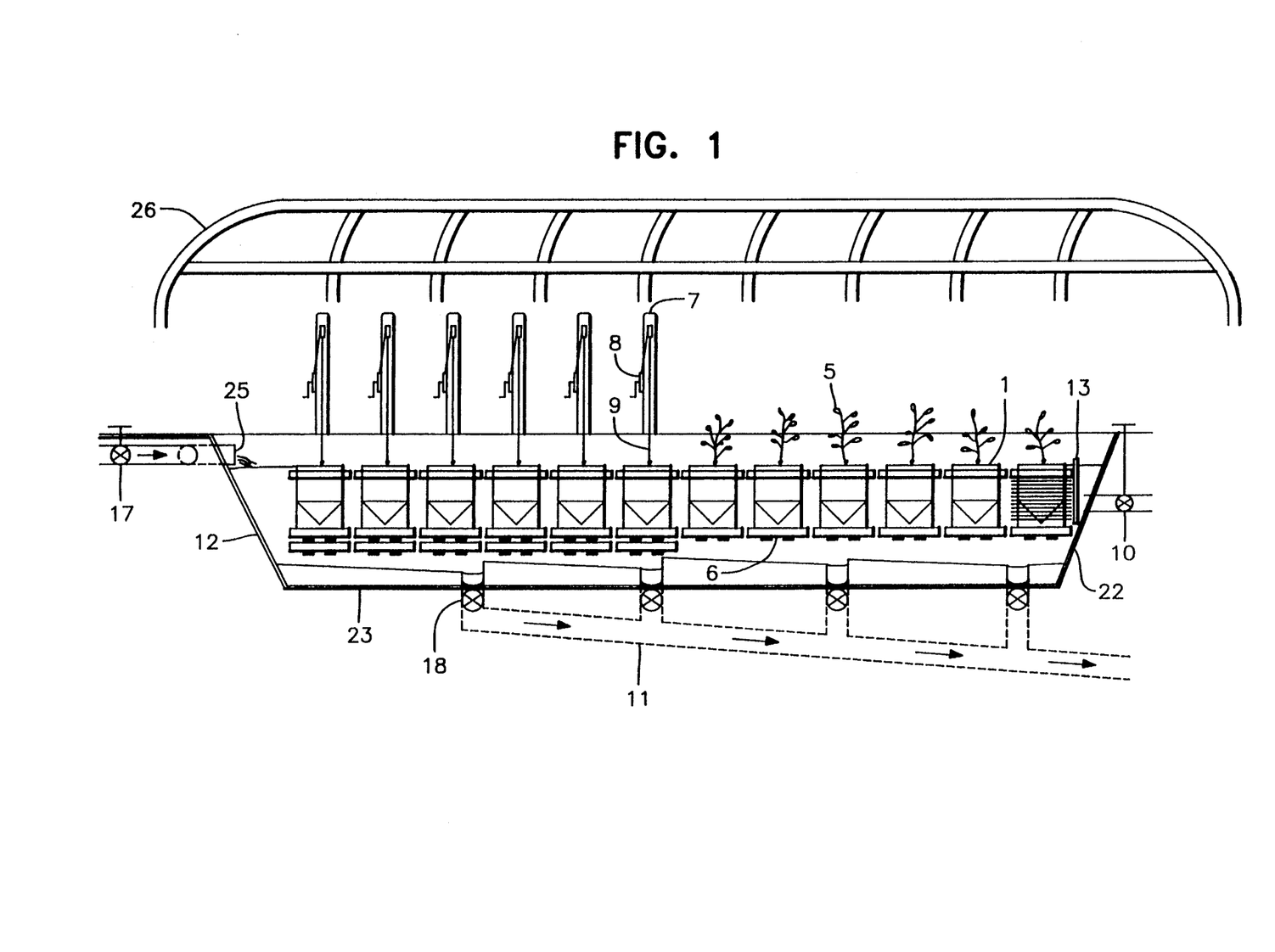
FIG. 1 is a vertical sectional view illustrating the entire basin from the influent of the waste water to the effluent from the basin.
Figure 2:
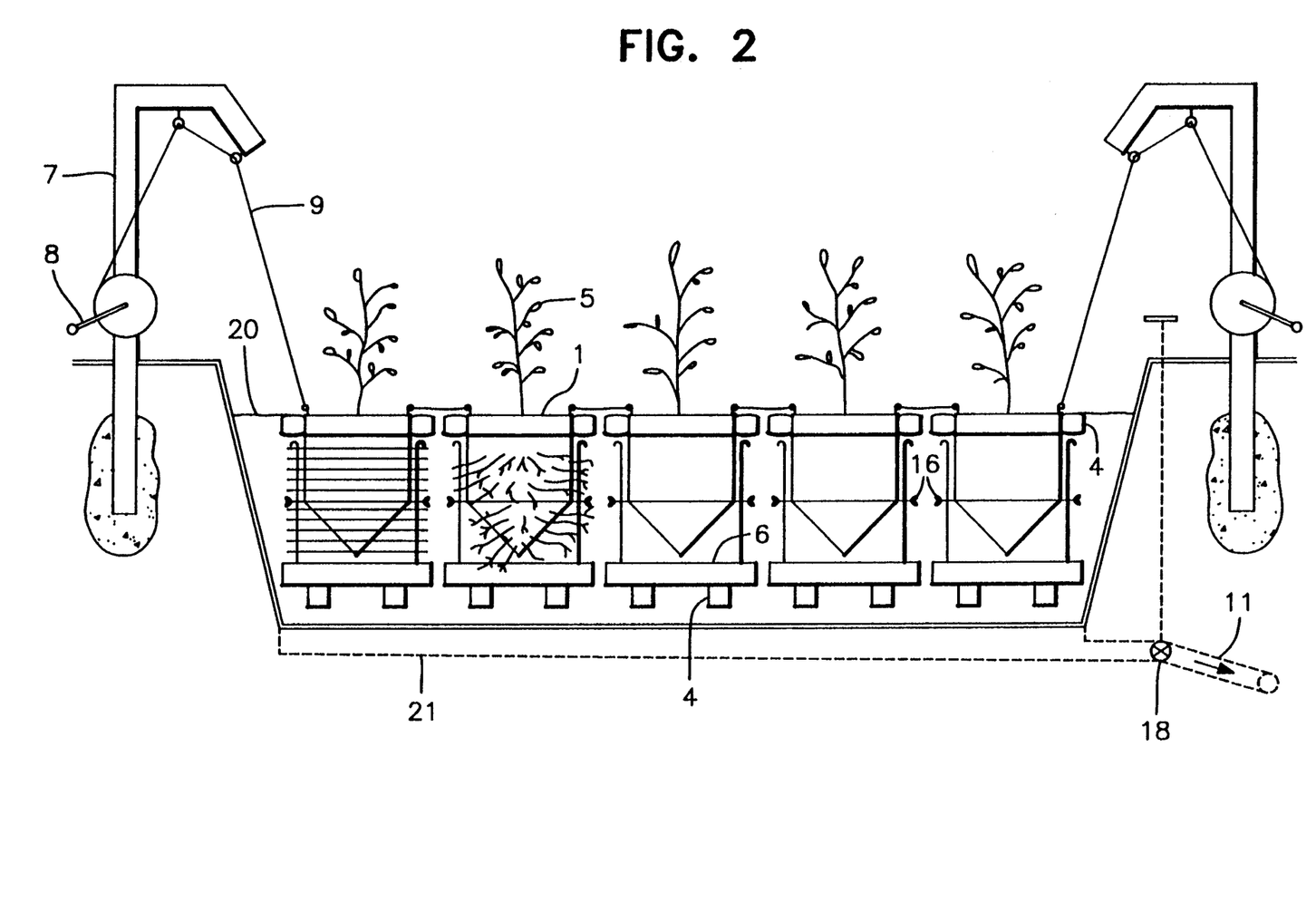
FIG. 2 is a vertical sectional view transverse to that of FIG. 1.

The modified wetland basin, as seen in FIG. 1, can function as a wetland plant treatment facility, without solids media filling the entire basin. Eliminating the solids from the basin and designing a method to float wetland plants that otherwise cannot float and to provide the wetland plants with a life support and filtering system is the heart of the invention.

The modified basin includes walls 22, basin bottom 23, and collection and removal troughs 21, whose function and operation will be described shortly. Between each collection trough 21, the basin bottom 23 shall be inclined as shown, the degree of which may vary to suit each operator's fancy. It is believed that a slope of ten to fifteen percent would be preferred for the basin bottom 23 between the troughs 21 and the troughs 21 themselves would also be sloped similarly, in order that the sludge settled at the bottom of the basin would be removed therefrom through valve drain 18. Again, the collection and removal troughs 21 herein described are not themselves indispensable to the invention, since the wetland plants in their habitat and the basin, without being totally occupied by solids media, are able to function as waste water and pollution cleaners, but it is a matter of convenience and preference that the collection troughs 21 be presented as part of the invention. Because the basin bottom 23 is sloped as described above, the sludge and mineralized deposits that have been reduced and have settled on the bottom will gravitate into the troughs 21 and when valve 18 is opened, these will be removed from the basin altogether.

Waste water is admitted at one end of the basin through influent valve and pipe 17 and exits through the opposite end by means of an adjustable outfall or effluent valve 10. The adjustable outfall valve 10 will permit the operator of the basin to vary, increase or decrease the amount of waste water being treated. It will also allow him to increase or decrease the detention time of the waste water within the basin. The longer the detention time the more thorough the treatment and the clearer and cleaner will be the effluent from the basin. For a given amount of waste water, the increase in depth of the basin will mean a greater detention time.

The cables or ropes 9 are secured to posts 7 on either side of the basin and by means of winches and pulleys 8, the operator can bring to the side of the basin all the wetland plants enclosed in their basket habitat 1 and secured to said cable or rope 9.

Each basket assembly 1 is attached to cable or rope 9 by means of clip 24 and can be removed from the basin by means of winch assembly 8, attached to posts 7. The winch assembly 8 permits any one or the entire row of wetland plants to be removed from the basin for any number of reasons: (1) replacement of a plant; (2) increasing or decreasing the distance between plant-basket assemblies; or (3) raising or lowering adjustable floor assemblies 6 under basket assemblies 1 thereby vertically controlling the root system of each plant and consequently expanding or decreasing the aerobic zone or area within the basin.

Basin cover 26, shown in FIG. 1, may be simply a plastic cover over the basin to protect the wetland plants from extreme cold or may be a more elaborate hot house structure to enclose the entire basin. If plastic sheeting is used, some means should be reserved to roll it out of the way to access the plants in the basin. Should a hot house structure be employed, sufficient room should be allowed around the perimeter of the basin for the operator to work and to bring in and use small mobil equipment and machinery. Again, the cover or hot house is not indispensable to the invention, as the basin with its wetland plant habitat system can function in virtually all kinds of weather. However, extreme cold such as may be found in Canada and many northern U.S. communities will cause a slow down in the metabolic activity within the basin.

The following is a description of the system for treating waste water according to the invention. Waste water, defined as water containing or bearing any polluting substance, enters the treatment basin, heretofore described, at 25. The treatment basin is constructed by excavating a rectangular shaped hole, although the geometric configuration of the basin may consist of any number of other possibilities. The preferred geometric shape is rectangular with the length ten or more times its width. The depth of the basin may be as little as one foot to four feet or even more. It is believed that a four foot depth, at its deepest points, is reasonable and will satisfy any operational options that the operators may desire to use.

The floor of the basin will be transversed by drainage or removal troughs 21 spaced at intervals of ten to fifteen feet so that sludge or settled solids on the bottom of the basin will more readily move down the inclined slope of the bottom 23 of said basin into the removal troughs 21. The removal troughs are similarly inclined, at about 5% so that when valve 18 is opened, the solids are removed from the basin. The basin bottom may be lined by heavy gauge plastic liner as is now the practice. Posts 7 with winch attachments 8 are anchored along the sides of the basin which provide the means of regulating the placement of the basket assemblies 1 containing the wetland plants 5. Each wetland plant 5 with its environment 2 of humus, clay, rich earth, activated carbon, charcoal, rare earths, and/or wood, encapsulated within a basket assembly 1 by a lining of straw, supported and held in place by cable or rope 9 and assisted in a floating manner by float attachments 4 becomes a waste water treatment and filtration system. As explained above, each plant contains aerenchymas cells that supply oxygen to the root system from whence it is leaked into the water surrounding the plant, providing an environment that greatly encourages the production of protozoa and metazoa bacteria that feed upon and reduce pollution in water into gases and mineralized matter, which hopefully and expectedly, cannot be further organically reduced. Some of the matters in polluted water such as nitrogen, potassium, and phosphorus compounds may be taken into the plant, but that portion remaining after treatment by the bacteria colonies will in large measure be removed from the waste water stream by filtration and sorption by the soil, humus, activated carbon, charcoal, clay, and rare earths surrounding each plant 5 within the basket assembly 1 heretofore described. The major elements that contribute to pollution in virtually all domestic waste water will be carbonaceous matter consumed by aerobic bacteria, ammonia (nitrogen) converted to nitrates by aerobic zone bacteria, nitrates converted to nitrogen gaseous state in the anaerobic zone, phosphorus and potassium compounds, some reduced by aerobic bacteria or taken into the plants, but considerable amounts will be sorbed into the soils and materials placed into the wetland basket assembly.

As each plant enclosed in its basket habitat floats atop the waste water stream the depth of the treatment basin can be varied by the operator from as little as one foot to five or more feet. The greater the depth within the basin, the greater and more extensive can be the root system of the wetland plant, thereby enlarging the rhizosphere area within which the aerobic bacteria will thrive and treat the waste water stream. By constructing an adjustable floor under the basket assembly the operator of the treatment basin can limit the depth at which the root system will be allowed to go, thereby encouraging a horizontal growth and creating an oxygen rich area above the flexible floor and an anaerobic area below the floor where different processes will take place. It is in these anaerobic areas that the settling and settled solids will be most effectively treated.

However, as previously pointed out, anaerobic bacteria can generate aesthetically unpleasant odors. If this should become a problem, the operator now has the option of lowering the adjustable floor, deeper into the basin, thus promoting and encouraging the root system of the plant and its rhizosphere deeper into the basin, enlarging the aerobic treatment area of the basin and at the same time reducing the anaerobic zone. The anaerobic zone can also be reduced by simply lowering the depth of the waste water in the basin by opening valve 10, without adjusting the floor assembly under the plant basket. However, on the down side, this maneuver will reduce the amount of waste water that can be treated at any one time and also lessen the detention time within the basin. Hence, by this arrangement and system, the operators of this waste water treatment process are able to enlarge or limit the anaerobic zone either by adjusting the depth of the basin or controlling the depth to which the rhizomes are permitted to develop by adjusting the flexible floor of each basket assembly. Similarly, the aerobic zone within the basin may be controlled in the same manner.

The embodiment of this invention permits the elimination of solids media of any kind from within the basin, which have the effect of restricting the flow of waste water within the basin, and limits the growth of root and rhizospheres of the wetland plants, all of which handicaps the known system in the treatment of waste water utilizing wetland plants. This is accomplished by eliminating the solids media throughout the basin and constructing a habitat for each plant such that the media within each basket assembly is adequate only to support the life system of that plant and to provide some filtration and sorption by means of which additional pollutants are removed other than by bacterial actions. The elimination of the solids media as practiced and used today means that more waste water can be subjected to treatment processes within the basin, and is also means that each plant root and rhizosphere is freer to develop, grow and hence to expand the oxygenated area within the basin and, therefore, treat a greater volume of waste water per day, than is now possible.

Another significant advantage to using wetland plants in a floating habitat as the present invention envisions, is that as the flow of waste water varies during any given time the plant is allowed to ride the crest of the waste water stream. This in turn will cause the rhizomes and aerobic areas to move up or down, which in turn will cause aerobic and anaerobic bacteria to alternately grow in logarithmic proportions and accelerate the treatment process. By this system and through the use of the adjustable floor devices, it will be possible to introduce within the basin other and higher forms of life than bacteria, such as fresh water anemones and mollusks, to name only two which can be placed on the floor or tier of floors of the adjustable floor system. These higher life forms also have the ability to consume and treat suspended and colloidal matter within the waste water stream. A cover or hot house 26 over the basin is a recommended option particularly in severe cold weather in higher northern climates, but this is not indispensable to the invention, as the hardiness and usefulness of wetland plants, such as bulrushes, has been demonstrated even in icy conditions.

It has been demonstrated by present technology and usage that wetland plant roots once having been provided with sufficient soil to serve as initial life support, have the ability to grow 2 to 2½ feet out into sand or a gravel substrate and receive nourishment from the waste water system. The sand, gravel or fly ash substrate has no inherent ability to provide nourishment but serves only as lateral support for the root system. It is intended, therefore, to provide thin wafers or slats 14 as lateral support while the root system expands outside the wetland habitat. It is outside the habitat that the mass of root system will draw sustenance from the waste stream and create an environment favorable for aerobic bacteria growth.

I claim:

1. An apparatus for treating waste water comprising, in combination:
   a waste water basin having a basin bottom, basin walls extending upwardly from said basin bottom and a substantially open basin top defined by upper edges of said basin walls, said waste water basin having at least one inlet provided therein for introducing waste water to be treated into said waste water basin and having at least one outlet provided therein through which treated waste water leaves said waste water basin; and
   means for treating waste water in said waste water basin, said waste water treating means comprising:
      a plurality of container means disposed along the surface of waste water in said waste water basin, each of said container means containing at least one wetland plant and a life sustaining amount of a particulate solid media for said wetland plant, said container means comprising a material having holes therethrough such that said container means retains said particulate solid media therein and allows a root system of said wetland plant to grow outwardly therethrough and into the waste water;
      means associated with said container means for enabling the wetland plants in said container means to float on the surface of the waste water in said waste water basin, with the root system of said wetland plants oriented substantially downwardly toward said basin bottom; and
      adjustable means for controlling the downward growth of the root systems of said wetland plants, said adjustable growth controlling means being located between said container means and the basin bottom.

2. The apparatus according to claim 1, further comprising means for controlling the level of waste water in said waste water basin, said level control means comprising a valved inflow conduit in fluid communication with the inlet of the waste water basin and a valved outflow conduit in fluid communication with the outlet of the waste water basin.

3. The apparatus according to claim 1, further comprising means for connecting said plurality of container means to one another, said connecting means being anchored outside said waste water basin.

4. The apparatus according to claim 3, wherein said connecting means comprises a winch assembly for moving said plurality of container means along the surface of the waste water in the waste water basin.

5. The apparatus according to claim 1, wherein said adjustable growth controlling means comprises a plurality of platforms, each of said platforms being associated with a respective container means, and means for moving each of said platforms relative to its respective container means so as to vary the vertical distance between the platform and its respective container means.

6. The apparatus according to claim 5, wherein each of said platforms has a number of openings therethrough, said openings being sized to prevent the root system of the respective wetland plant from growing therethrough and to permit settleable solids from the waste water to pass therethrough.

7. The apparatus according to claim 5, further comprising waste water cleansing life forms carried by said platforms, said waste water cleansing life forms being selected from the group consisting of anemones and mollusks.

8. The apparatus according to claim 1, wherein said basin bottom has at least one transverse trough extending thereacross and at least one sloping basin bottom portion leading to said trough to permit settled and treated solids from the waste water to proceed into said trough for removal from said waste water basin.

9. The apparatus according to claim 8, further comprising a valved conduit in fluid communication with said trough.

10. The apparatus according to claim 1, further comprising means for laterally supporting the root systems of said wetland plants.

11. The apparatus according to claim 10, wherein said lateral supporting means are carried by said container means and comprise a plurality of slats positioned between said container means and said adjustable growth controlling means.

12. The apparatus according to claim 1, wherein said particulate solid media comprises at least one member selected from the group consisting of soil and humus.

13. The apparatus according to claim 12, wherein said particulate solid media further comprises at least one member selected from the group consisting of clay, activated carbon, charcoal, sand and burned and unburned wood.

14. The apparatus according to claim 1, further comprising means for covering the open top of said waste water basin.

15. The apparatus according to claim 1, wherein at least one wetland plant is an emergent plant having substantially no capacity to float in water.

16. An apparatus for treating waste water comprising, in combination:
   a waste water basin having a basin bottom, basin walls extending upwardly from said basin bottom and a substantially open basin top defined by upper edges of said basin walls, said waste water basin having at least one inlet provided therein for introducing waste water to be treated into said waste water basin and having at least one outlet provided therein through which treated waste water leaves said waste water basin;
   means for controlling the level of waste water in said waste water basin, said level control means comprising a valved inflow conduit in fluid communication with the inlet of the waste water basin and a valved outflow conduit in fluid communication with the outlet of the waste water basin; and
   means for treating waste water in said waste water basin, said waste water treating means comprising:
      a plurality of container means disposed along the surface of waste water in said waste water basin, each of said container means containing at least one wetland plant and a life sustaining amount of a particulate solid media for said wetland plant, said container means comprising a basket of webbed material having holes therethrough such that said container means retains said particulate solid media therein and allows a root system of said wetland plant to grow outwardly therethrough and into the waste water, said particulate solid media comprising at least one member selected from the group consisting of soil and humus;

flotation means associated with each of said container means for enabling the wetland plants in said container means to float on the surface of the waste water in said waste water basin, with the root system of said wetland plants oriented substantially downwardly toward said basin bottom;

adjustable means for controlling the downward growth of the root systems of said wetland plants, said adjustable growth controlling means comprising a plurality of platforms, each of said platforms being associated with a respective container means and means for moving each of said platforms relative to its respective container means so as to vary the vertical distance between the platform and its respective container means; and means associated with each of said container means for laterally supporting the root systems of said wetland plants, said lateral supporting means being attached circumferentially to said container means and comprising a plurality of slats positioned between said container means and the platform of its respective adjustable growth controlling means.

* * * * *